US007831587B2

(12) United States Patent
Dymetman

(10) Patent No.: US 7,831,587 B2
(45) Date of Patent: Nov. 9, 2010

(54) EVENT HIERARCHIES AND MEMORY ORGANIZATION FOR STRUCTURED DATA RETRIEVAL

(75) Inventor: Marc Dymetman, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 704 days.

(21) Appl. No.: 11/801,514

(22) Filed: May 10, 2007

(65) Prior Publication Data

US 2008/0281857 A1 Nov. 13, 2008

(51) Int. Cl.
*G06F 7/00* (2006.01)
*G06F 17/30* (2006.01)

(52) U.S. Cl. .................. 707/711; 707/713; 707/741; 707/791

(58) Field of Classification Search .......... 707/999.005, 707/999.003, 999.004, 711, 713, 741, 791; 704/231, 235
See application file for complete search history.

(56) References Cited

U.S. PATENT DOCUMENTS

| 6,243,713 | B1 * | 6/2001 | Nelson et al. ................ 1/1 |
| 2006/0010126 | A1 * | 1/2006 | Anick et al. .................. 707/4 |
| 2006/0161532 | A1 * | 7/2006 | Wen et al. ...................... 707/3 |
| 2007/0083505 | A1 * | 4/2007 | Ferrari et al. .................. 707/5 |

OTHER PUBLICATIONS

Baeza-Yates et al., "Modern Information Retrieval," ACM Press, pp. 191-228, 1999.

Baeza-Yates et al., "Fast Text Searching for Regular Expressions or Automaton Searching on Tries," Journal of the ACM, vol. 43, No. 6, pp. 915-936, 1996.

Wikipedia, "Hasse diagram," at //en.wikipedia.org/wiki/Haase_diagram, pp. 1-5. Jan. 10, 2007.

Simard et al., "Translating with non-contiguous phrases," HLT, 8 pp., 2005.

Zhao et al., "Bridging the Semantic Gap in Image Retrieval," Idea Group Publishing, pp. 14-36, 2002.

Daelemans et al., "Forgetting Exceptions Is Harmful in Language Learning," Kluwer academic Publishers, pp. 1-34, 1999.

Melcuk et al., "A Formal Lexicon in the Meaning-Text Theory . . . ," Computational Linguistics, vol. 13, Nos. 3-4, pp. 261-275, 1987.

U.S. Appl. No. 11/315,043, filed Dec. 2005, Cancedda et al.

* cited by examiner

*Primary Examiner*—Giovanna Colan
(74) *Attorney, Agent, or Firm*—Fay Sharpe LLP

(57) ABSTRACT

From a corpus of segments, a hierarchical index is derived that indexes high frequency events of a selected event type occurring in segments of the corpus at a frequency higher than or equal to a threshold frequency, and also indexes at least some low frequency events that occur in segments of the corpus at a frequency lower than the threshold frequency. The hierarchy relates events by an order structure in which coarser events subsume finer events. A query is processed respective to a queried event. The processing references information stored in the index relating to either (i) the queried event if the queried event is indexed or (ii) a coarser event that is indexed and that subsumes the queried event if the queried event is not indexed.

16 Claims, 4 Drawing Sheets

EVENT HIERARCHIES AND MEMORY ORGANIZATION FOR STRUCTURED DATA RETRIEVAL

BACKGROUND

The following relates to information indexing, storage, retrieval, processing, analysis, and related arts. It particularly relates to indexing, content retrieval, content analysis, and related processing of text-based documents, and is described with particular reference thereto. However, the following more generally relates to information generally, such as indexing, retrieval, content analysis, and related processing of images, documents, semantic analyses, translation databases, lexicons, information archives, and so forth.

Electronic information storage is ubiquitous, and massive quantities of information are stored on the Internet, corporate databases, governmental electronic archives, and so forth. A key technology for facilitating use of such stored information is effective indexing and retrieval of selected contents. Indexing can use a pre-defined system based on selected keywords or the like. However, pre-defined indexing is limited in scope and usefulness. For example, a pre-defined index is not useful if the keywords used by a person searching the content are different from those selected by the index system designers. Moreover, indexing by keywords is only one approach; more generally, it is desirable to provide an indexing system that can locate or analyze occurrences of events, where an event is a general concept that may include, for example: an ordered sequence of words, possibly with some gaps or discontinuities; occurrence of a semantic structure in semantically annotated documents; the existence of a particular feature vector for characterizing images; or so forth.

Automated indexing is known, in which the information is analyzed to extract likely indexing keywords or the like. In such approaches, a tradeoff is made between the size of the index, on the one hand, and the level of indexing specificity on the other hand. For example, in automated keyword indexing it is common to index only those words (or perhaps phrases) that occur more than a threshold number of times in the documents. Increasing the threshold makes the index more compact, but at the cost of less specificity and reduced query efficiency since infrequent keywords are lost. Unfortunately, in some cases it is precisely the infrequent words or phrases that are omitted from a compact index are of most interest.

For events more complex than keywords or phrases, automated indexing continues to suffer from the undesirable compactness-versus-effectiveness tradeoff, and also suffers substantial difficulty in identifying events of interest in the documents. A straightforward approach for such identification is to scan the document using a suitable search algorithm, and keep a count of each event discovered by the search. However, this approach can be computationally intensive. Moreover, since it is not known a priori which events are frequent enough to justify indexing, this approach typically involves accumulating storage of a count for each event (no matter how rare) during the scan, which can be expensive in terms of temporary data storage allocation.

Still further, the type of event that is useful for indexing may vary depending upon the corpus being indexed, the subject matter of the corpus, and so forth. For example, a keyword-based index is useful for some tasks and some corpuses, but may be ineffective for other tasks or other corpuses.

Accordingly, it would be useful to provide indexing methods and systems that produce compact indices that are nonetheless useful for querying on infrequent or rare events, and that can construct such useful indices without using excessive amounts of computational and storage resources, and that are flexible as to the event type upon which the indexing is based, and that overcome other deficiencies of existing indexing methods and systems.

CROSS REFERENCE TO RELATED APPLICATIONS

Cancedda et al. Ser. No. 11/315,043 filed Dec. 22, 2005, is entitled "Machine Translation Using Non-Contiguous Fragments of Text." U.S. Ser. No. 11/315,043 filed Dec. 22, 2005 and since issued as U.S. Pat. No. 7,536,295 is incorporated by reference herein in its entirety.

BRIEF DESCRIPTION

In some illustrative embodiments disclosed herein, an indexing method comprises: deriving from a corpus of segments a hierarchical index that indexes events of a selected event type occurring in segments of the corpus at a frequency higher than or equal to a threshold frequency, the hierarchy relating events by an order structure in which coarser events subsume finer events, the hierarchical index further indexing at least some low frequency events that occur in segments of the corpus at a frequency lower than the threshold frequency; and processing a query respective to a queried event, the processing referencing information stored in the index relating to either (i) the queried event if the queried event is indexed or (ii) a coarser event that is indexed and that subsumes the queried event if the queried event is not indexed.

In some illustrative embodiments disclosed herein, an information system comprises a hierarchical index having a hierarchy relating events of a selected type by an order structure in which coarser events subsume finer events, the hierarchical index containing entries for all high frequency events of the selected type occurring in segments of a corpus at a frequency higher than or equal to a threshold frequency, the hierarchical index storing for each high frequency event at least one statistical datum.

In some illustrative embodiments disclosed herein, an information system is disclosed, comprising a hierarchical index having a hierarchy relating events of a selected type by an order structure in which coarser events subsume finer events, the hierarchical index containing entries for all high frequency events of the selected type occurring in segments of a corpus at a frequency higher than or equal to a threshold frequency, the hierarchical index storing for each high frequency event at least one statistical datum, and further containing entries for a subset of all low frequency events of the selected type that occur in segments of the corpus at a frequency lower than the threshold frequency, the subset including those low frequency events that are not subsumed by any coarser low frequency events, the hierarchical index storing for each event of the subset at least an identification of those segments of the corpus that satisfy a predicate associated with the low frequency event.

In some illustrative embodiments disclosed herein, a method is disclosed for identifying all high frequency events of a selected event type in a corpus, a high frequency event being an event occurring in a number of segments of the corpus higher than or equal to a threshold frequency, the method comprising: (0) initializing the corpus as an empty corpus; (x) adding a selected segment to the corpus; (t) discovering all events of the selected event type in the selected segment; (a) determining whether each discovered event occurs in segments of the corpus including the selected segment at a frequency greater than or equal to the threshold frequency; (n) identifying any discovered event satisfying the determining operation (a) as a high frequency event; and (b) repeating the operations (x), (t), (a), and (n) until all segments of interest have been added to the corpus, the repeating operation (b) utilizing identifications made in previous iterations of the operation (b) to accelerate the determining.

DETAILED DESCRIPTION

Figure 1:
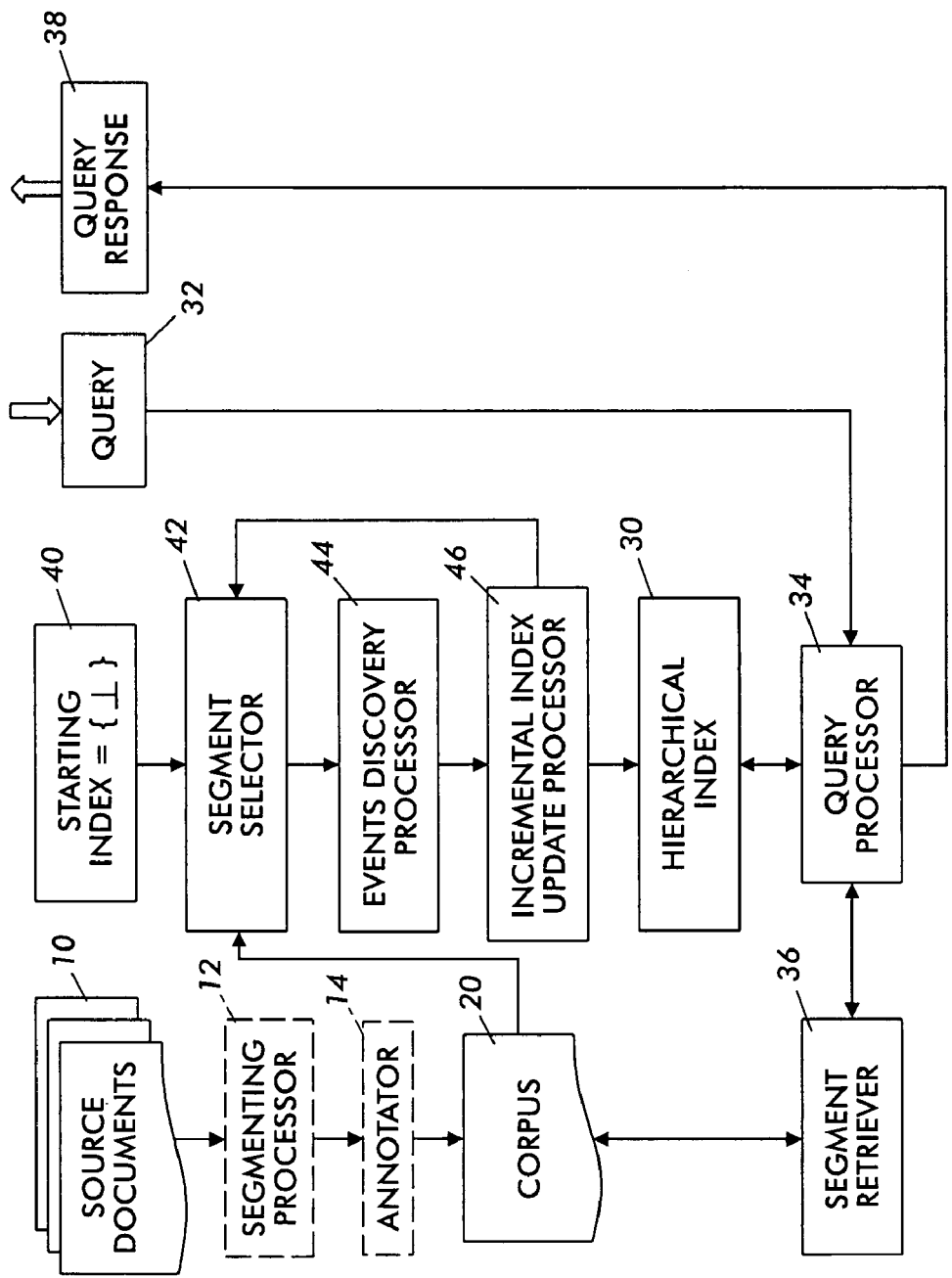
FIG. 1 diagrammatically shows an illustrative indexing system.

With reference to FIG. 1, an illustrative indexing system is described. The illustrative indexing system is configured to index text-based documents; however, it is to be appreciated that the indexing techniques disclosed herein are more generally applicable to organizing, searching, querying, or otherwise processing any collection of information, such as an image repository, quantitative database, collection of writings in a non-alphabetic form, or so forth.

In the illustrated example, the content to be indexed is a collection of source documents 10. The documents 10 can be generated or received in various ways. For example, some source documents may have originated electronically, as word processing documents for example, or downloaded from the Internet in a text-based format. Some source documents may have been received in hardcopy form, and are optically scanned and processed by optical character recognition (OCR) to generate text-based documents. Some source documents may have been received as image files, and text-based equivalents produced by OCR.

Once the source documents 10 are in a text-based format, they are optionally processed by a segmenting processor 12 that breaks the text into segments, that is, smaller portions, for processing. For example, the text may be segmented into sentences each delineated by a capital starting letter and terminating in a period or other termination punctuation mark. Alternatively, the text may be segmented into paragraphs, lines on a page, or may be segmented on another basis. In some embodiments, the source documents 10 are received in a suitably segmented form, for example as XML documents in which paragraphs, sentences, or other suitable segments are delineated by XML tags, and the segmenting processor 12 is suitably omitted. The segmented text is optionally processed by an annotator 14 that adds selected annotations. For example, the annotator 14 in some embodiments is a parser that annotates words (or, more generally, tokens) with their parts-of-speech or other grammatical annotation. In some embodiments, the annotator 14 is omitted.

The result of the various optional processing 12, 14 is a corpus 20. The illustrated corpus 20 includes segments of text (such as sentences, paragraphs, lines, or other delineations of text) and optionally includes annotation of tokens in each line of text. The term "corpus" typically denotes a collection of writings on a selected subject or of a particular kind. As used herein, the term "corpus" encompasses such typical examples, and more generally encompasses any collection of information that has been segmented into smaller portions or segments so as to facilitate retrieval or processing on a per-segment or other apportioned or segmented basis. For example, the corpus may be an album or other collection of images, in which each image is a segment, and the elements of each segment (roughly analogous to words in a text segment) may be elements of a feature vector, elements of a principal components analysis (PCA) representation, or other image content representation. As another example, the corpus may be an English-French translation corpus in which each segment includes a sentence or other segment of text in parallel English and French translations. These illustrative corpora are examples intended to illustrate the breadth and generality of application of the indexing methods and systems disclosed herein.

The indexing techniques disclosed herein are suitable for indexing events in such corpora. For the illustrated text-based corpus 20, an example of an event type is the "bag-of-words" event. An example of such a bag-of-words event is the event e=[dog, cat]. Each event has an associated predicate that may or may not hold or be satisfied by a particular segment of the corpus 20. Predicates are denoted herein using a "hat" notation, for example, the predicate of event e is denoted as ê. Thus, for bag-of-words event e=[dog, cat] and a segment s, the predicate ê(s) is satisfied if the segment s (such as a sentence, line-of-text, or other unit of textual content) contains both the word "dog" and the word "cat".

Another illustrative type of event used to illustrate the disclosed indexing techniques is the discontinuous word sequence event type. If the event e=[dog . . . cat] is a discontinuous word sequence event, then its predicate ê(s) is satisfied if the segment s contains the word "dog" before the word "cat". Hence, for the segment $s_1$="The dog chased the cat" the predicate ê($s_1$) is satisfied, whereas for the segment $s_2$="The cat tricked the dog" the predicate ê($s_2$) is not satisfied, because "cat" occurs before "dog" in segment $s_2$.

The bag-of-words event type and the discontinuous word sequence event type are two illustrative examples that are suitably applied to a text-based corpus such as the illustrative corpus 20. It is to be appreciated that other types of events are definable for text-based corpuses, and further that other types of events may be appropriate for indexing other types of corpuses. For example, in an English-French translation corpus, an event $e_t$=[dog, chien] may have a predicate $ê_t(s)$ that is satisfied for any English-French language text pair in which the word "dog" occurs in the English sentence and the word "chien" occurs in the counterpart French sentence.

The indexing techniques disclosed herein are applicable to event types that can be ordered using an event hierarchy or order structure in which coarser events subsume finer events. If an event a is coarser respective to an event b, then event a subsumes event b, by which it is meant that whenever a segment s satisfies the predicate of event b (that is, b̂ (s) is satisfied), it necessarily follows that the segment s also satisfies the predicate of the event a (that is, â (s) is also satisfied). For example, the bag-of-words event a={dog,cat} is coarser respective to the bag-of-words event b={dog,cat,man} (or, equivalently, the bag-of-words event b={dog,cat,man} is finer respective to the bag-of-words event a={dog,cat}) because whenever a segment satisfies the predicate b̂ for event b (in this instance meaning that the segment contains all three words "dog", "cat", and "man" in arbitrary order) it necessarily follows that the same segment satisfies the predicate â for event a (in this instance meaning that the same segment necessarily contains both words "dog" and "cat" in arbitrary order). In this description, a looser notation is sometimes used—for example, "event a is coarser than event b" or "event b is finer than event a" may be used herein. However, it is to be understood that coarseness and fineness are relational concepts, and an event is "coarser" or "finer" respective to another event.

More generally, in the event hierarchy or order structure coarser events subsume finer events. In other words, if event e is coarser than event e' (or, equivalently, e' is finer than e), then it follows that any segment s that satisfies the predicate ê'(s) of the finer event e' necessarily also satisfies the predicate ê(s) of the coarser event e. Another consequence of this subsuming property is that any segment s that does not satisfy the predicate ê(s) of the coarser event e necessarily also does not satisfy the predicate ê'(s) of the finer event e'. Another consequence of this subsuming property is that the frequency of a coarser event e in a corpus C, denoted freq(e, C), must be greater than or equal to the frequency freq(e',C) of an event e' that is finer respective to the event e in the corpus C.

The term "frequency" as used herein denotes a measure of the number of occurrences of an event. In some embodiments the frequency of an event e in a corpus C is quantified as the number of occurrences of the event e in the corpus C. In other embodiments, a normalized frequency may be used, for example freq(e,C)=$N_e/N_C$ where $N_e$ denotes the number of occurrences of the event e in the corpus C and $N_C$ denotes the number of segments in the corpus C. The normalized frequency $N_e/N_C$ is bounded by the range [0,1], while the unnormalized frequency $N_e$ has the range [0,$N_C$]. Other frequency measures may be used. In the examples set forth herein, the frequency is quantified as the number of occurrences of the event in the corpus (e.g., $N_e$ for event e in corpus C).

Each occurrence of an event e corresponds to a segment for which the predicate ê(s) holds. This is a binary value—either the predicate ê(s) holds, or it does not. The frequency is the count of occurrences, that is, the count of segments for which the predicate holds. For example, given an event e of the bag-of-words type in which e={the}, and a segment s="The man took out the garbage", the predicate ê(s) holds because the word "the" appears in the segment s. In fact, the word "the" appears twice in the segment s; however, this corresponds to a single occurrence denoting that the predicate ê(s) holds. In some embodiments, the index may store information including the "true count", that is, a count that recognizes that the event e="the" appears twice in segment s.

Using such an ordering structure enables an indexing system to be constructed in which high frequency events are indexed (that is, have entries in the index), but which can nonetheless be used to facilitate queries on lower frequency or even rare events that are not indexed (that is, do not have entries in the index). A high frequency event is defined herein as an event that occurs in the corpus at a frequency greater than or equal to a threshold frequency. If the index is limited to such high frequency events, it is seen that when a query is made respective to an event, one of two possibilities arise. The first possibility is that the queried event is a high frequency event that occurs in the corpus at least the threshold number of times—in this case, the queried event is actually indexed (that is, the index contains an entry corresponding to the queried event), and so the query is readily processed based on information actually contained in the index. The second possibility is that the queried event is a low frequency event that occurs in the corpus fewer than the threshold number of times. In this case, the queried event is not indexed (that is, the index does not contain an entry corresponding to the queried event)—however, if a coarser event is indexed, then the index is still useful because the segments identified by the index entry for the indexed coarser event define a sub-corpus of segments that may contain the queried event. For example, if event e is a high frequency event (and hence is indexed) and queried event e' is a finer event that is not indexed, then processing of the query is facilitated in spite of event e' not being indexed, because it is sufficient to consider only the sub-corpus of those segments for which the index indicates the predicate ê(s) holds in processing the query on event e'. This is a consequence of the subsuming nature of the ordering structure and of the fact that (in this example) event e' is a finer event respective to the event e.

If only high frequency events are indexed, then there is no assurance that the queried event will be a finer event respective to a coarser high frequency event that is indexed. This situation arises if there are no coarser events respective to the queried event having a frequency in the corpus higher than or equal to the threshold frequency. In such a case, the predicate of the queried event potentially holds for every segment of the corpus, and accordingly is considered in processing the query. This is generally inefficient.

Moreover, even if there is a coarser high frequency event in the index, that higher frequency event may have limited computation-saving value if the frequency of the indexed event is high. For example, consider a query relating to the bag-of-words event {the, that}. Such an event may be relatively rare in the corpus, and accordingly may be unindexed. The coarser events {the} and {that} are likely to be high frequency events in the corpus, and hence are likely to be indexed. However, the coarser events {the} and {that} are likely to be very high frequency events—in some corpora the event {the} may occur in almost every sentence (assuming the corpus is segmented into sentences) and {that} will similarly be quite frequent in many corpora. The search encompasses the intersection of the event {the} and the event {that}, and may be quite large. Again, this is generally inefficient.

To address these concerns, in the illustrated embodiments the index indexes (that is, includes entries for) both high frequency events, that is, events that occur in segments of the corpus at a frequency higher than or equal to a threshold frequency, and at least some low frequency events that occur in segments of the corpus at a frequency lower than the threshold frequency. In some embodiments, the low frequency events that are indexed in the hierarchical index include at least those low frequency events that are not subsumed by any coarser low frequency events occurring in segments of the corpus at a frequency lower than the threshold frequency. Such events are denoted herein as "mlf" events (minimal low frequency events), and defined as events that: (i) occur in the corpus at a frequency lower than the threshold frequency (that is, are low frequency events), and (ii) are not subsumed by any coarser events occurring in the corpus at a frequency lower than the threshold frequency (that is, are not subsumed by any coarser low frequency events).

Figure 2:
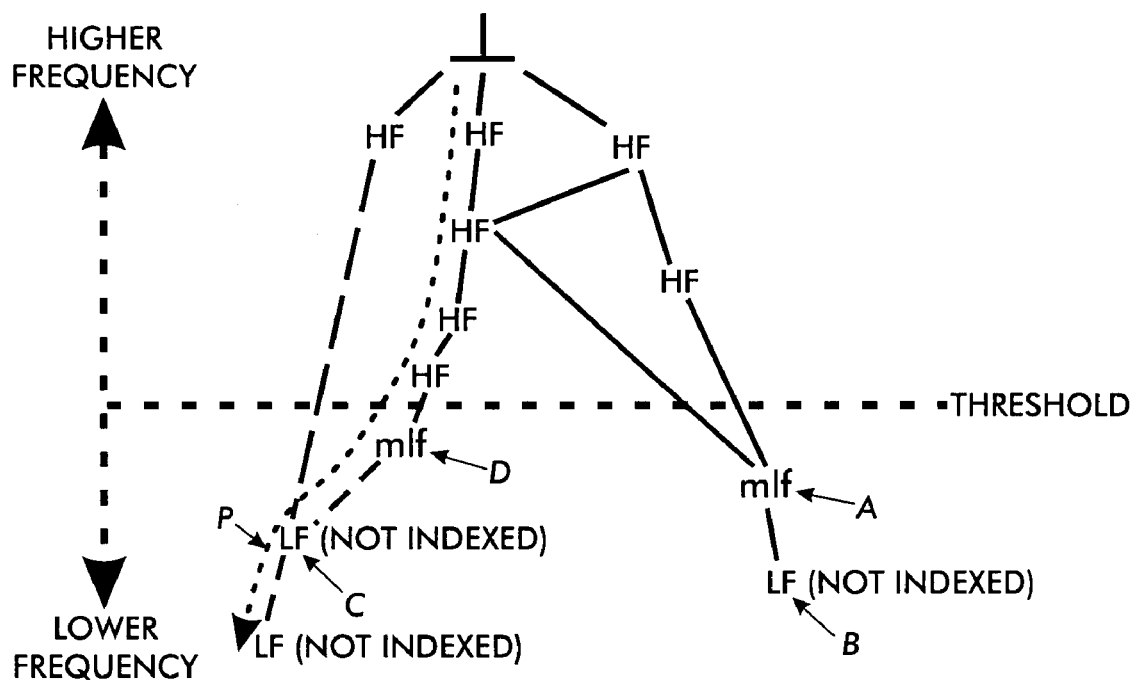
FIG. 2 diagrammatically shows the graph of an illustrative hierarchical index.

With reference to FIG. 2 this indexing approach alleviates the aforementioned disadvantages of an index that indexes only high frequency events. For example, consider the low frequency event A of FIG. 2. This event has no coarser low frequency events in the corpora preceding it. Thus, by definition it is an mlf event, and is therefore indexed. Processing of mlf event A is therefore straightforward, because it is indexed. Event B is a low frequency event that is preceded by a coarser low frequency event; thus, event B is neither a high frequency event nor an mlf event, and is not indexed. Because event B is low frequency, but not minimal low frequency, there is at least one minimal low frequency event which precedes it, namely the mlf event A in FIG. 2. Since event B is a finer event respective to event A, it follows that event B is subsumed by event A. Processing of a query regarding event B is therefore suitably performed by considering only those segments satisfying the predicate of event A. As event A is an mlf event, it follows that this number of segments to be considered must be less than the threshold number of segments. Hence, the processing of a query on event B is computationally reasonable. As a final example, consider event C indicated in FIG. 2. The event C is not an mlf event, because it is subsumed by a coarser event D that occurs in the corpus at a frequency lower than the threshold frequency. However, processing of a query on event C is computationally reasonable because event C is subsumed by the indexed mlf event D, and so only those segments satisfying the predicate of mlf event D need to be considered—this number must be less than the threshold, because the event D is an mlf event.

To generalize, in the illustrated embodiments the index stores both high frequency events that occur in segments of the corpus at a frequency higher than or equal to a threshold frequency, and mlf events that both (i) occur in segments of the corpus at a frequency lower than the threshold frequency and (ii) are not subsumed by any coarser events occurring in segments of the corpus at a frequency lower than the threshold frequency. In this way, it is assured that either a queried event is indexed or, if it is not indexed, then there is a mlf event that is indexed that subsumes the queried event. The predicate for this subsuming mlf event, moreover, holds for fewer than the threshold number of segments of the corpus. Accordingly, processing of the query involves either (i) directly utilizing information stored in the index, or (ii) processing (for example, searching) fewer than the threshold number of segments, with the segments to be processed identified by the index information pertaining to the subsuming indexed mlf event. Such an index is useful for expediting any query regardless of the rarity of the queried event; and yet, the index is typically compact because it stores only high frequency events and the mlf events, but not other low frequency events. A selected tradeoff between query expediting and index compactness can be achieved by selecting the threshold, which as described herein can be adjusted uniformly or non-uniformly at any time, even after the index is constructed.

Having given a general description of the indexing methods and apparatuses, a more detailed explanation and illustrative examples are set forth. In the following, a conceptual coarsest event is defined, which is denoted by the symbol "⊥". See, for example, the topmost "⊥" element of the illustrative graph shown in FIG. 2. The conceptual event "⊥" is by definition more coarse respective to any event occurring in the corpus. Conversely, any event occurring in the corpus is finer respective to the conceptual event "⊥". To each event e is associated a predicate ê on segments, where ê(s) is read "the event e holds on s", and ¬ê(s) is read "the event e does not hold on s". In a looser notation sometimes used herein, the symbol e is used in place of ê.

The ordering structure is symbolically represented using mathematical inequality signs. For example, given events e and e', the representation e<e' denotes the condition that event e is coarser respective to e', or equivalently e' is finer respective to e. If e≦e' (where the symbol ≦ denotes that event e is coarser than or equal to event e') then, for all segments s, ê'(s)⇒ê(s). In other words, a coarser event always holds of a segment for which the finer event holds. The conceptual event "⊥" is considered to hold of all segments. For any segment s, the set {e|ê(s) is true} is finite. An illustrative corpus $C=\{s_1, s_2, \ldots s_N\}$ is considered, where the corpus C includes N segments specified as segments $s_1, s_2, \ldots s_N$. The symbol mlf has already been defined, and represents minimum low frequency. The symbol lf represents low frequency (that is, a frequency below the threshold frequency), while the symbol hf represents high frequency (that is, a frequency at or above the threshold frequency). In setting forth these definitions, it is to be understood that the threshold can be uniform, or can be different for different event paths of the hierarchical ordering structure graph. A function freq(e,C) is suitably defined as the frequency of event e in corpus C. By definition, if an event e does not occur in the corpus C, then it is a lf event, and is more specifically designated as a zero-frequency (zf) event. It will also be noted that whenever e≦e' and event e' is hf, then it follows that the event e is also hf. If an event a is finer than an event b (or, equivalently, event b is coarser than event a) then it follows that freq(a,C)≦freq(b,C). That is, a finer event has a lower (or equal) frequency of occurrence in the corpus than a coarser event, because the coarser event subsumes the finer event. By definition, the conceptual event "⊥" is hf. If a corpus C' is larger than and includes all segments of a corpus C, then for any event e it follows that whenever an event e is hf with respect to corpus C, then the event e is also hf with respect to the larger corpus C'. Extending the corpus can only increase the frequency of e.

Using the notation set forth herein, if some event e is lf relative to corpus C, and if no strictly coarser event e' (that is, e'<e) is lf relative to corpus C, then the event e is a mlf event relative to the corpus C. It follows from the definition of mlf that all events strictly coarser than event e are high-frequency relative to C. Predecessors and successors in the ordering structure are set forth as follows. Consider two events e and e' such that (i) e<e', and (ii) there is no event e" such that e<e"<e'. Then event e' is considered to be an immediate successor of event e, and event e is considered to be an immediate predecessor of event e'.

With returning reference to FIG. 1, in the illustrated embodiments, a hierarchical index 30 is constructed, which indexes (that is, contains entries for) all the hf events relative to the corpus 20 and indexes all mlf events relative to the corpus 20, but does not index other (non-mlf) lf events relative to the corpus 20. For each hf event entry, at least one statistical datum is optionally stored. The stored one or more statistics depend on the segments for which the predicate of the hf event holds, and do not depend on any segments for which the predicate of the hf event does not hold. For example, each hf event entry may include an identification of the segments of the corpus for which the predicate of the hf event holds. For each mlf entry, at least one statistical datum is optionally stored. The stored one or more statistics depend on the segments for which the predicate of the mlf event holds, and do not depend on any segments for which the predicate of the mlf event does not hold. For example, the entry for each mlf event may include an identification of the segments of the corpus for which the predicate of the mlf event holds. Each entry in the index 30 is suitably flagged as hf or mlf. This flagging can take various forms. In some embodiments, a type bit or other indicator is included with each entry, so, for example, having the type bit equal to one may indicate hf while having the type bit equal to zero may indicate mlf (or vice-versa). In other embodiments, each index entry stores a count of the number of occurrences, that is, the number of segments of the corpus 20 satisfying the predicate of the indexed event. Then, determining whether the indexed event is hf or mlf is suitably performed by comparing this stored count of occurrences with the threshold—if the count equals or exceeds the threshold then the indexed event is hf, otherwise it is mlf.

The hierarchical index 30 has certain properties. The database has an up-saturated property, meaning that if an event e is in the index 30, then any event e' that is coarser respective to e is also in the index 30. In particular, for any event e in the database (whether it be hf or mlf), all predecessors of the event e have index entries in the index 30 and are hf. The proof of this up-saturation property is straightforward: if event e is hf, then any coarser event is also hf, and hence has an entry in the index 30. On the other hand, if the event e is mlf, then any strictly coarser event is by definition hf, and hence has an entry in the index 30. Events which are neither hf nor mlf do not have entries in the index 30. The hierarchical index 30 also has a characterization property. An event e is indexed in the index 30 if it satisfies the following characterizing property defined as follows: event e is not zero-frequency and all immediate predecessors of event e are hf.

Using the hierarchical index 30 facilitates faster queries on the corpus 20. In a suitable arrangement, a query 32 is input to the system, and is processed by a query processor 34. In the following illustrative example, the query 32 is assumed to be a retrieval query that requests retrieval of all segments of the corpus 20 for which the predicate of a query event e holds. The query processor 34 references the index 30 to facilitate this retrieval. First, the query processor 34 determines whether the query event e is indexed in the hierarchical index 30 and, if it is indexed, whether it is hf or mlf. The latter determination is suitably made using the stored type bit, or by comparing a stored count of occurrences with the threshold, or so forth. For a retrieval query, it is advantageous for each index entry to store an identification of the segments of the corpus for which the predicate of the indexed event holds. These segment identifications are forwarded to a segment retriever 36 that retrieves the identified segments, and the query processor 34 formulates a suitable query response 38 that is communicated back to the originator of the query 32 or to an output designated in or with the query 32.

This processing is straightforward, because the query event e is indexed in the index 30. On the other hand, if there is no entry for the query event e in the index 30, it follows that the query event e is lf and is not mlf. If the query event e is not indexed, then the query processor 34 suitably searches for an indexed event $e_i$ that is flagged mlf and that is coarser respective to the query event e (that is, satisfies the condition $e_i<e$). If such a coarser indexed event $e_i$ is not located, then it follows that the query event e is zero frequency (zf, and hence also lf), and the query processor 34 formulates a suitable response. If a coarser indexed mlf event $e_i$ is found, then the segments identified by the indexed event $e_i$ as satisfying the predicate of event $e_i$ are retrieved by the segment retriever 36, and each such segment is inspected to determine whether the predicate of query event e holds. The query processor 34 returns the segments for which the predicate of query event e holds or, if no such segments exist, returns a suitable response indicating that the query event e has zero frequency in the corpus 20.

An optimization can be made if the query event e is finer than two or more different mlf events in the index 30. In order to retrieve information of a lf query event e, it is sufficient to inspect segments that belong to the intersection of the segment sets associated with indexed mlf events that are coarser than the query event e. In some cases, this can be more efficient that just looking at the larger segment set associated with just one such mlf.

The illustrative query processing for a segments retrieval query is readily adapted to other types of queries. For example, if the query asks for a true count of occurrences of the query event e in the corpus 20, then the processing is the same except that, rather than formulating the query response 38 to contain the retrieved segments, the query processor 34 instead inspects each segment to determine the number of true occurrences of the query event e in this sub-set of the corpus 20. For some queries, it may not be necessary to retrieve any segments—for example, the statistics stored with each indexed event entry may be sufficient to formulate the query response 38. If the query event is not indexed, some segments are typically retrieved and inspected in order to acquire sufficient information to formulate the query response 38. However, the number of retrieved segments is always less than the threshold.

In general, to respond to a query either statistics directly stored in the index 30 are used (in the case of a hf or mlf event which is indexed), or a sub-set of segments less than the threshold are retrieved and inspected to acquire the information to respond to the query. If the threshold is uniform for the hierarchical index 30, then the number of segments to be inspected is uniformly bounded by that threshold. Thus, the computational time is substantially reduced and, advantageously, has an upper limit imposed by the threshold. At the same time, the storage space for the index 30 is advantageously relatively compact since the index 30 stores entries for only hf and mlf events.

Another retrieval operation that may be of interest is the following: given a candidate event e, retrieve those events e' of hf or mlf type respective to the corpus C, which are coarser than event e. The general solution, using the graph of the hierarchical index 30 (for example, embodied as lists of immediate successors for indexed events) is as follows: First start with the conceptual event "⊥", which is coarser than event e. Then find all immediate successors of the conceptual event "⊥" which are at the same time coarser than event e. Collect these and for each of them, do the same recursively. At the end of this process, a collection of all events in the database that are coarser than event e is obtained.

With continuing reference to FIG. 1, some suitable illustrative techniques for building the hierarchical index 30 are set forth. An incremental technique starts with a corpus C that already exists, and an additional segment {S} is added to the corpus C to form an extended corpus $C^+$. The extended corpus $C^+=C\cup\{S\}$, that is, $C^+$ is the union of the corpus C and the additional segment {S}. Advantageously, this incremental technique can also be used to generate the index 30 given the corpus 20—to do so, the already-existing corpus C is defined to be empty, a starting index 40 is defined as containing only the conceptual event "⊥" that is considered to hold of all segments, and the index 30 is built incrementally by processing each segment of the corpus 20 in turn until the extended corpus $C^+$ includes all segments of the corpus 20.

The iterative index build employs a segment selector 42 to select a segment of the corpus 20. Typically, the build starts by selecting the first sentence or other first segment of the corpus 20 for processing, and iteratively processes successive sentences or segments until the corpus 20 is fully processed. An event discovery processor 44 inspects the selected segment to identify all events of the selected event type to be indexed (such as bag-of-words events, discontinuous ordered word sequence events, or another event type). Although all events are identified, this is not computationally intensive and does not involve substantial storage, since only a single segment (e.g., a single sentence) is being processed by the event discovery processor 44 at any given time.

The discovered events are processed by an incremental index update processor 46 to determine whether each event is already indexed (that is, the event was hf or mlf in the index prior to processing of the new segment) or whether the event should be added to the index. For the first segment, the index contains only the conceptual event "⊥" that is considered to hold of all segments, and so there is no possibility that a discovered event is already indexed. However, the illustrative build process is iterative, and is intended to work both in such a starting situation and after the index has been built up.

The illustrated incremental index update processor 46 uses a procedure eval(e, $C^+$) to determine the frequency status of a discovered event e relative to the updated corpus $C^+$. The frequency status is either high frequency (hf) or low frequency (lf). First, the eval( ) procedure searches the already existing index for the corpus C (that is, the corpus before updating with the new segment) to determine whether the event e is already indexed as a hf event. If the event e is found to already be indexed as a hf event (that is, hf(e,C) holds) then the eval( ) procedure identifies the event e as high frequency in the updated corpus $C^+$, and computes the statistics of event e relative to the updated corpus $C^+$. If the event e is determined to be low frequency (that is, lf(e, $C^+$) holds), the eval( ) procedure computes the sub-corpus of the segments of $C^+$ for which the event e holds, denoted herein as subcorp(e, $C^+$). The number of segments of the sub-corpus subcorp(e, $C^+$) is typically small and is always smaller than the threshold (otherwise, the event is hf), and so the eval( ) procedure determines the hf, mlf, or lf status of the event e by direct inspection of the segments of the sub-corpus subcorp(e, $C^+$).

In a suitable approach, the eval(e, $C^+$) procedure operates as follows. Suppose that discovered event e is in the index for the corpus C (that is, the event e was indexed before the corpus C is updated to $C^+$), and the index entry for event e is tagged as hf. In this case, the index entry for event e in the updated index for the corpus $C^+$ remains tagged hf in the updated index, because the event e remains hf in the updated corpus $C^+$. To establish the statistics of the event e relative to the updated corpus $C^+$, the stored statistics of the already existing index of corpus C are used, and are updated to incorporate any statistical changes introduced by the addition of the new segment for which the predicate of event e holds. Such an update is readily performed for typical statistics of interest without going back and inspecting the segments of the corpus C for which the predicate of event e holds. For example, if the true count is a stored statistic, then the true count is readily updated by inspecting the new segment to determine the number of instances of event e (which must be at least one since the predicate of event e holds for the segment, but which may be greater than one if the event is repeated in the same new segment) and adding this number to the previously stored true count. If the statistics include a list of segments for which the predicate of event e holds, then the new segment is appended to that list of segments. Other statistics of interest are similarly readily updated.

If, on the other hand, the event e was not already indexed and tagged as a hf event, then the event e must be a lf event. In this situation, the eval( ) procedure searches the already existing index for corpus C to determine whether there is an mlf event e' in the index of corpus C such that the indexed mlf event e' is coarser than or equal to event e, that is, e'≦e. If such a coarser mlf event e' is indexed, then the indexed mlf event e' is used to identify a subcorp(e',C) of segments of the corpus C for which the event e may hold. Event e' is coarser than event e in which case event e' subsumes event e, or event e is mlf in corpus C and e'=e. In either case, it follows that the predicate of event e cannot hold on any segment of corpus C that is not in subcorp(e',C). It follows that the subcorpus of the updated corpus $C^+$ which is relevant for establishing the properties of event e is subcorp(e',C) plus the new segment obtained by the segment selector 42. That is, the relevant subcorpus is RSC=subcorp(e',C)∪{S}, where RSC denotes "relevant subcorpus", the symbol "∪" is the union operator, and {S} denotes the new segment. In order to establish the hf, lf or zf status of event e relative to the updated corpus $C^+$, it is sufficient to establish counts respectively only to the relevant subcorpus RSC. Because the event e' is mlf, it follows that the relevant subcorpus RSC cannot contain more than the threshold number of segments, assuming that {S} consists of a single new segment.

Optionally, further refinement of the relevant subcorpus can be made if the event e is found to be finer than two or more different indexed events. For example, if the event e is found to be finer than three different indexed events $e_1'$, $e_2'$, and $e_3'$, then the relevant subcorpus can be defined as the intersection of the sub-corpora subcorp($e_1'$,C), subcorp($e_2'$,C), and subcorp($e_3'$,C) then united with {S}, that is, the relevant subcorpus is [subcorp($e_1'$,C) ∩ subcorp($e_2'$,C) ∩ subcorp($e_3'$,C)] ∪{S}.

The only remaining case for the eval( ) procedure to consider is the situation when the already-existing index for corpus C does not contain any hf entry corresponding to the event e, and also does not contain any mlf entry that is coarser or equal to discovered event e. This implies that the discovered event e cannot hold on any segment of the corpus C. In this case, the relevant sub-corpus for establishing the frequency and statistics of discovered event e is RSC={S}, and the new segment {S} is inspected to establish the properties of event e relative to the updated corpus $C^+$. In view of the definition of an mlf event as an event that (i) occurs in the corpus at a frequency lower than the threshold frequency, and (ii) is not subsumed by any coarser events occurring in the corpus at a frequency lower than the threshold frequency, it follows that in this last case the new event e is added to the index as an mlf event with freq(e, $C^+$)=1.

The illustrated incremental index update processor 46 uses the eval( ) procedure for computing the properties, respective to the updated corpus $C^+$, of each event e discovered in the new segment {S}. In updating the index, it is typically sufficient to update only the discovered events that hold on the segment {S}, as the frequencies and statistics of other events are not affected. (Some statistics of events that do not hold on the segment {S} may also be updated to reflect the increased size of the corpus—for example, if normalized frequencies are used then the stored normalized frequency of each event that does not hold on the segment {S} is suitably reduced by multiplication with a factor $N_C/(N_C+1)$ to reflect the larger corpus $C^+$, where $N_C$ is the number of segments in the corpus C and ($N_C+1$) is the number of segments in the corpus $C^+$. In the illustrated embodiment, however, unnormalized frequencies are used and so no such corpus size updating is applied). The index update is suitably performed as follows: the set of events E={e|e in DB(C) and ê(s)} is computed. This is the set of all events holding on new segment {S} which are also indexed in the already-existing index for corpus C. All these events have either hf or mlf status relative to the corpus C. The set $HF^+$={e|ê(S) and hf(e, $C^+$)} is computed. The set $HF^+$ are the events holding on new segment {S} which have a high-frequency status relative to the updated corpus $C^+$. The set $HF^+$ is suitably obtained by induction as follows. First, the set $HF^+$ is initialized as $HF_0^+$={⊥}. It is assumed by induction that $HF_k^+$={e|ê(S) and hf(e, $C^+$) and dist(⊥,e)=k}, where the distance between the conceptual event "⊥" and event e is by definition the integer "length" of the shortest increasing path connecting conceptual event "⊥" and event e, that is, ⊥<$e_1$<$e_2$ . . . <$e_k$=e. An incrementally updated set $HF_{k+1}^+$ is computed follows. Consider the set of candidates:

$$HFCand_{k+1}^+ = \left\{ e \mid \hat{e}(S) \text{ and } \begin{array}{l} (\exists\, e' \in HF_k^+, \\ e \text{ immediate successor of } e') \\ \text{and } (\forall\, i \leq k, e \notin HF_i^+) \end{array} \right\}$$

which are the events that hold on the new segment $\{S\}$, are immediate successors of a hf event of the previous level k, and are not themselves of a level equal or inferior to k. For each e belonging to this set, perform the procedure eval(e, $C^+$). If, according to this evaluation, hf(e, $C^+$) holds, then the event e belongs to $HF_{k+1}^+$. If, according to this evaluation, hf(e, $C^+$) does not hold, then the event e does not belong to $HF_{k+1}^+$. If, at a certain point, $HF_{k+1}^+ = \emptyset$, then stop and return $$HF^+ = \bigcup_{i \leq k} HF_i^+.$$

The set $MLF^+ = \{e \mid \hat{e}(S) \text{ and mlf } (e, C^+)\}$ is also computed. These are the events holding on the new segment $\{S\}$ which have a minimal low-frequency (mlf) status relative to the updated corpus $C^+$. Consider the set of candidates:

MLFCand$^+ = \{e \mid \hat{e}(S)$ and $(\exists e' \in HF^+, e$ successor of $e')$ and $e \notin HF^+\}$ These are the events that hold on the new segment $\{S\}$, are lf or zf relative to the updated corpus $C^+$, and are immediate successors of a hf event relative to the updated corpus $C^+$. For each event e in this set of candidates, it is determined whether it is minimal. This determination is made by determining whether all immediate predecessors of the candidate event e are high frequency relative to the updated corpus $C^+$, that is, belong to $HF^+$. For each surviving event e, the evaluation eval(e, $C^+$) is performed. If the result is a zero frequency event, flag this event as zf(e, $C^+$), otherwise flag this event as mlf(e, $C^+$), and associate with it the corresponding list sub-corp(e, $C^+$). At the end of this process, all the events have been computed which hold of new segment $\{S\}$ and which are either hf or mlf relative to the updated corpus $C^+$, along with the relevant information. The old set of entries E are removed from the index and are replaced with the newly produced entries, so as to obtain a new index for the updated corpus $C^+$.

An alternative process for updating the index to reflect addition of the new segment $\{S\}$ is as follows: first consider all events that hold on $\{S\}$, and for each event, evaluate whether it is hf or lf using the eval( ) procedure. Then, events which are not minimal are removed. This alternative process is, however, more computationally intensive since all events holding on $\{S\}$ are considered for inclusion in the updated index. By contrast, the procedure set forth for the illustrated incremental index update processor 46 considers as candidates for inclusion in the updated index only those events that are successors to events that have been previously classified as hf.

An optional optimization of the procedure set forth for the illustrated incremental index update processor 46 is as follows: proceed level by level, but for an event of a given level, at the point where the eval( ) procedure is applied, note whether the event is hf or lf. At a current level, the events which are considered for the next level are only those events e such that (i) event e is the immediate successor of some event at the current level, and (ii) all the immediate predecessors of event e which are already listed at some level have a hf status. It can be shown that all candidates for inclusion in the updated index will be found in this way. At the end of this first-pass process—that is, when the next level becomes empty—a second pass is applied to filter out those lf events at any level for which some immediate predecessor is not hf. The remaining lf events are mlf events, and should then be included in the updated index. Those events which are hf are tagged with a hf flag, and those which are lf are tagged with a mlf flag. The condition (ii) is not trivial because it is not generally the case that an order structure on events is such that if an event is at level k (meaning that its shortest path to the origin conceptual event "⊥" is of length k), then all its immediate predecessors are at level k−1—counter-examples for some event structures can be found. Thus it is advantageous to verify at the end that all immediate predecessors of lf candidates for inclusion in the updated index were actually hf, in order to account for lf events e of level k for which a lf predecessor at a level greater than k−1 may exist. However, for certain event types such as bag-of-word event types and discontinuous word sequence event types, levels are well behaved and it is indeed the case that all the predecessors of a level k event are at level k−1. For the illustrative bag-of-word and discontinuous word sequence event types, the level of an event can be determined by counting the number of words appearing in the representation of the event—accordingly, all predecessors of a level k event are at level k−1 for these event types. In such cases, the verification at the end is optionally omitted, and the hf and mlf status of the events can be determined in one forward pass over the levels. In similar fashion, other optimizations may be possible for specific event types and order structures.

Given an event type and a corpus, the threshold for distinguishing lf and hf event types may be a uniform threshold, suitably expressed by a constant value such as a threshold t=100 for example. An event is considered to be hf if its corpus frequency is larger than or equal to the threshold t. Given a query 32 pertaining to a query event e, at most t segments are accessed in order to process the query. This provides a processing time-bound that is roughly linear in the threshold t. Informally, this is because in order to retrieve the statistics of a query event e, two operations are involved. First, relevant database keys are retrieved. These database keys are those events e' of hf or mlf type respective to the corpus C, which are coarser than the query event e. The retrieval of these keys may, for example, use the recursive retrieval process described previously herein. The time for this retrieval is typically small. Then, the statistics are retrieved. If a key is found which is hf and coincides with event e, the retrieval of its statistics is immediate. On the other hand, if a key is found which is mlf and is coarser than query event e, then the retrieval of its statistics involves dynamic evaluation of the statistics of query event e on a sub-corpus comprising at most t segments. This latter operation is typically roughly linear in threshold t. Thus, by using a small value of threshold t, the statistics of a query event e can be computed quickly. But, making the threshold t small typically increases the number of indexed events, and thus may be at the cost of building a large index. Having a large index may conflict with storage space constraints.

To reduce the storage space of the index, the threshold at which an event is considered to be hf should be increased. The threshold may be increased uniformly, for instance by taking t'=t+k, where k is some integer, or non-uniformly by increasing the threshold by different amounts for different events or different event paths.

Consider first a uniform threshold increase, in which the threshold t is increased by a uniform amount k to obtain a new threshold t'=t+k. In this case, all events which were previously considered lf remain lf, but some events which were hf now become lf. Any transformed hf-to-lf events that are not mlf under the new threshold t' should be pruned, that is, removed from the index. A suitable pruning operation is as follows: (i) flag all elements of the index that are changed to a non-minimal lf status by the threshold increase (these event entries will have been either hf or mlf prior to the threshold increase); (ii) prune from the index all event entries which are strictly below (that is, strictly finer) than any such new-lf events; and (iii) flag as mlf all the remaining new-lf events and as hf all the remaining hf elements. The resulting index has the new, higher threshold t' and has entries properly labeled as either hf or mlf, with no extraneous entries. Moreover, the updated index generally contains fewer elements and hence occupies reduced storage space.

Figure 3:
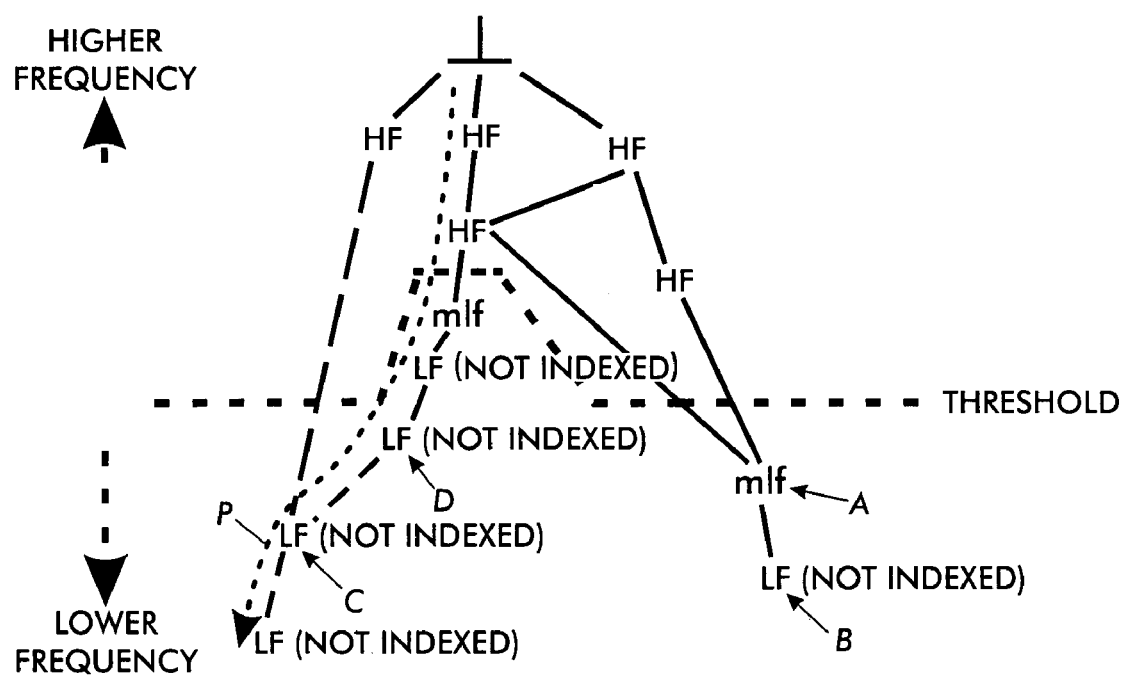
FIG. 3 diagrammatically shows the graph of FIG. 2, but with the threshold for one event path adjusted.

With reference to FIGS. 2 and 3, consider next a non-uniform threshold increase. FIG. 2 shows the graph of an index having a uniform threshold t. In FIGS. 2 and 3, solid connecting lines connect two events that are both indexed, while dashed connecting lines connect two events at least one of which is not indexed. For example, events A and D are both indexed in FIG. 2, whereas events B and C are not indexed. An event path P is indicated in both FIGS. 2 and 3. The illustrative event path P starts at the conceptual event "⊥" and proceeds through four successor events of hf type to the indexed mlf event D, and thence to the unindexed event C of lf type and terminates at another unindexed lf event that is a successor of event C. In going from FIG. 2 to FIG. 3, the threshold for the event path P is increased while the threshold for other event paths is not increased. As shown in FIG. 3, the effect of this non-uniform threshold increase is to make event D as well as its two immediate predecessors of the lf type. During pruning, the event D and its immediate predecessor along the event path P are removed from the index due to the non-uniform threshold increase, and the second-closest predecessor of event D along the event path P is retained in the index and becomes mlf.

In one approach for balancing efficiency and storage space, the database construction process employing elements 40, 42, 44, 46 of FIG. 1 employs a low threshold, which typically provides short retrieval time. The corpus 20 increases in size as new segments are added to the corpus 20 during the building process. This building process may be performed in a single block, or may be accumulative as new text is obtained and added to the corpus 20. Each time a new segment is added, the corpus 20 increases in size, and in general the index 30 increases in size. At some point, the size of the index 30 may approach a designated storage limit. At this point, the threshold is increased either uniformly or non-uniformly to reduce storage occupancy. For example, the threshold may be multiplied by a selected amount. In conjunction with the threshold increase, pruning is performed to remove index entries that become non-minimal lf due to the threshold increase. This pruning frees the storage space. In this way, a good balance is achieved between retrieval times for the corpus 20 and storage space.

Having described illustrative embodiments of the index as examples with reference to FIGS. 1-3, indexing using the disclosed approaches is now described for some specific event types and ordering structures. These illustrative examples provide an illustration of the breadth of applicability of the disclosed indexing techniques—those skilled in the art can readily apply the disclosed indexing techniques to other event types and other ordering structures. The examples set forth herein use textual corpora; however, those skilled in the art can readily extend the indexing techniques to other types of corpora such as image collections, natural language translation databases, and so forth.

In one example, the event type is a bag-of-one-or-more-words, (also called a multi-set herein), and the order structure defines a finer event as a bag-of-words containing all words of a coarser event plus at least one more word. Events are unordered bags-of-words, and segments are textual in nature, such as text sentences. (The term "token" is sometimes used in the art, where tokens encompass words and other strings delineated by spaces or punctuation. The terms "words" and "tokens" are used interchangeably herein). The predicate $\hat{e}$ of an event e holds in a sentence s (that is, $\hat{e}(s)$ holds) if the bag-of-words of event e is a sub-multiset of the multiset of words associated with the segment s. For example, suppose that the segment s is the sentence "the dog chases the cat", then the following events (among others) hold of s: {the}, {cat, the}, {cat, dog, the, the}, and so forth. The order structure is suitably multiset inclusion—for instance, according to this order, we have {cat}<{cat,the}<{cat,dog,the} and so forth.

For the bag-of-word event type, suitable statistics for storage in the index 30 may include, for example, the number of occurrences of an event in the corpus 20, or the true count of the event in the corpus (where "true count" counts the same event being present twice in the same segment as two true count increments). For example, considering the event {dog, the} and the segment "The first dog and the second dog both chased the cat.", there is a single occurrence of event {dog, cat} in this segment, but the true count of event {dog,cat} in this sentence is two since there are two instances of the bag of words.

In one indexing embodiment for the bag-of-words event type, a threshold equal to 2 is used. Thus, events which hold of at least two sentences are considered high-frequency. As soon as an event (for example {cat, chases, dog}) appears once in a sentence of the corpus, but is subsumed by a coarser event that also appears once (for example {cat, dog}), the finer event does not appear in the database, for it is not mlf, and this property prevents many lf events from being stored in the database. Such a choice of threshold typically provides fast retrieval time, since only one sentence is inspected for lf candidates.

In another example, the event type is a discontinuous ordered word sequence including two or more words, and the order structure is defined as follows: if an event a can be derived from an event b by omitting one or more words of the discontinuous ordered word sequence of event b, then event a is a coarser event respective to event b and event b is a finer event respective to event a. That is, $e \leq e'$ if and only if the list of words corresponding to event e can be obtained from the list of words corresponding to event e' by deleting any number of words from the list of words of event e', where the deletion can occur anywhere in the list. For instance, according to this order structure, [take, out]≦[take, garbage, out]. Event e holds of a segment s if, considering the segment as an event s corresponding to a list of words, the condition $e \leq e'$ holds.

In another example, the event type is a continuous word sequence, and the order structure is such that an event e is coarser than an event e', i.e. $e \leq e'$, if and only if the list of words corresponding to the event e is a prefix of the list e'. An event e holds of a segment s if and only if the list of words corresponding to the event e appears as a continuous word sequence somewhere inside the segment s, considered as a list of words. To illustrate the ordering structure, [dog, chases]≦ [dog, chases, the, cat], and also the event [dog, chases] holds on sentence "the dog chases the cat". Here, mlf events are those events whose corresponding word lists are low-frequency in the corpus 20 and for which deleting one word at the end of the list results in a high-frequency event.

In another example, the event type is a discontinuous ordered word sequence including two or more words as defined previously, while the order structure is such that for events e and e', the ordering e≦e' applies if and only if the list of words corresponding to event e is a prefix of the list of words corresponding to event e'. Using this ordering structure, the relation [take, out]≦[take, garbage, out] does not hold, because [take,out] is not a prefix of [take,garbage,out]. On the other hand, the relation [take, garbage]≦[take, garbage, out] does hold, because [take,garbage] is a prefix of [take,garbage,out].

In other examples, the event type is a conjunction of events. A conjunction of events is defined as follows. Let e and e' be two events belonging to some event type E. Another event type is defined by the conjunction of e and e', denoted by e ∧e'. An event e ^ e' holds of a segment s if and only if both event e and event e' hold of the segment s. The conjunctive event e ∧e' does not itself necessarily belong to the event type E. The conjunctive event e ∧e' is defined as a predicate over segments, which the events in E may or may not be. As an example of a conjunctive event, consider the multiset (i.e., bag-of-words) event $e_{bow}$={"love", "money"}. The event $e_{bow}$ holds of those segments for which both the single-word bag-of-word events {"love"} and {"money"} hold. Using the conjunctive event concept, the event $e_{bow}$={"love", "money"} holds of exactly those segments for which the conjunctive event {"love"}∧{"money"} holds. Thus, in order to count occurrences of the event {"love"}∧{"money"} in the corpus, it is sufficient to compute the length of the segment list representing the intersection of the segment lists for {"love"} and {"money"}. This property may not hold for events having more complex internal structure. For example, consider the multiset event {"the", "the"}. It is not true that this event holds of those sentences that belong to the intersection of the lists associated with the single word event {"the"} and with the (same) single word event {"the"}. It is also not true that this event holds of the conjunctive event {"the"}∧{"the"}.

Another example of a conjunctive events uses conjunctions to combine continuous word sequence events. An example of such a conjunctive event is: "mary loves john"∧"blue eyes", which holds on a segment if both continuous word sequences are found in the segment. The conjunction of two events holds of segments for which both events hold individually.

Figure 4:
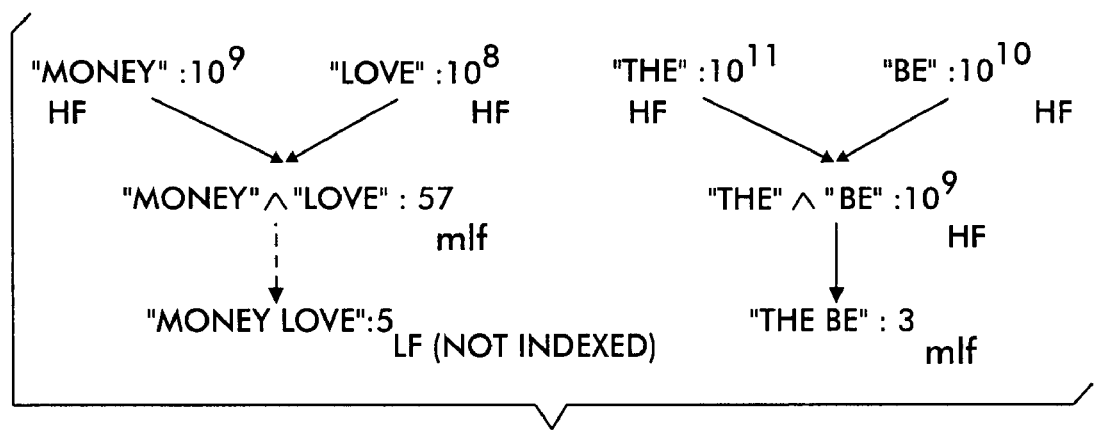
FIG. 4 diagrammatically shows a portion of a graph for an index including mixed events.

With reference to FIG. 4, a portion of the graph of an index including the conjunctive events "money"∧"love" and "the"∧"be" is shown, which illustrates the effect of introducing such conjunctive events on the frequency status of contiguous sequences such as "money love" and "the be". The "money love" event is not mlf anymore, because it is subsumed by the low-frequency "money"∧"love" which is mlf. This is indicated in FIG. 4 by using a dashed line to connect with the unindexed lf event "money love". The event "the be" remains mlf because the conjunctive event "the"∧"be" has hf status.

An index such as that of FIG. 4 can be made more compact in some instances by implicitly recording certain mlf events. This can be done, for example, by applying the following convention in the index—instead of explicitly storing in the database all hf and mlf events, only the hf events are explicitly stored along with those mlf events that are not conjunctive. Thus, in the example of FIG. 4, all indicated events are stored in the database, apart from the event "money"∧"love" (and the already unindexed lf event "money love"). The event "money"∧"love", although mlf, is not explicitly stored because it is also conjunctive. With this storage convention, all the mlf events in the corpus are still readily retrieved. For a non-conjunctive event, it is sufficient to examine the index to see if the non-conjunctive event is stored, as usual. On the other hand, a conjunctive event $e_1 \wedge e_2$, is stored explicitly in the index if it is hf. If the conjunctive event $e_1 \wedge e_2$, is not stored in the index, then its components $e_1$ and $e_2$ are considered—if both components are listed in the index with the status hf, then it follows that the conjunctive event $e_1 \wedge e_2$ is mlf, otherwise it is not mlf. In the case where it is mlf, the exact sub-corpus associated with the conjunctive event $e_1 \wedge e_2$ can be computed by a simple intersection between the sub-corpora associated with the component events $e_1$ and $e_2$. If it is desired to retrieve statistics of an event such as "money love", the event hierarchy of explicit hf and both explicit and implicit mlf elements is traversed in the index, hitting first the hf elements "money" and "love" and then the implicit mlf conjunctive event "money"∧"love", for which we then find the associated sub-corpus of 57 sentences by intersection of the sub-corpora for "money" and "love". The statistics of "money love" are then retrieved as usual. This implicit storage scheme has almost the same functionalities as a full storage of mlf events, but with the advantage that for the low-frequency events that are conjunctions of high-frequency events, explicit storage space is not used.

In other examples, the event type is a logical formula over dependency structures. Consider the situation of a collection of sentences which have been pre-annotated with syntactic/semantic relations, such as parts-of-speech. It would be useful to use such a corpus to find the statistics of, retrieve the context of, or otherwise investigate or probe certain situations such as "man bites dog" or "dog bites man". These situations will in general have different statistics. A index respective to the bag-of-words event type would be inefficient, as it would not distinguish between "man bites dog" and "dog bites man". For this situation, an index respective to an event type of first-order logical formulas of a restricted form is suitable. An example of such a formula is:

$$\exists x,y,z \; bite(x) \wedge arg1(x,y) \wedge dog(y) \wedge arg2(x,z) \wedge man(z)$$

Such first-order logical formulas are existentially quantified over all their variables (x, y, z in the above illustrative formula). Their body (after the quantification) is a conjunction of positive literals, so there is no negation, and no disjunction. The literals are either unary (e.g. bite(x) or dog(y)) or binary (e.g. arg1(x,y)). The unary literals belong to an open list corresponding to "words" (or to "concepts" if a semantic level is used rather than a syntactic one. The binary literals belong to a small list of "relational primitives", such as arg1, arg2, arg3, mod. The formulas are constrained in the following way: if a variable x appears in a binary literal (in first or second position), then it must also appear in at least one unary literal.

Figure 5:
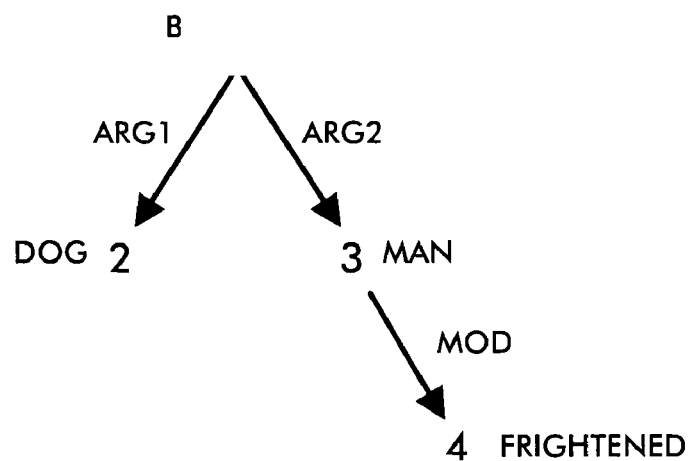
FIG. 5 diagrammatically shows a labeled relational graph encoded by an illustrative first-order logical formula.

With reference to FIG. 5, the first-order logical formula encodes constraints over a labeled relational graph. Such relational graphs can be used to represent syntactic or semantic dependency structures, semantic graphs, conceptual graphs, or so forth. The variables in the formulas are suitably interpreted as node identifying integers in the graph as shown in FIG. 5, the unary literals as properties of the vertices, and the binary literals as properties of the edges. The provision of such formulas that, if a variable x appears in a binary literal (in first or second position), then it must also appear in at least one unary literal, ensures that the formula does not encompass "bare" edges for which the endpoints are not specified; however, "connectivity" is not enforced in the formula. For instance the following formula is valid and holds of the graph shown in FIG. 5: ∃x,y,z bite(x) ∧arg1(x,y) ∧dog(y) ∧frightened(z). The indexing techniques disclosed herein are suitably applied to event types that include first-order logical formulas. Consider corpus segments that are relational structures of the kind depicted in FIG. 5, each corresponding to a single sentence. Consider also a uniform frequency threshold and that, relative to this threshold, the frequencies shown in the following table pertain:

| Event | Frequency |
| --- | --- |
| ∃ x,y,z bite(x) ∧ arg1(x,y) ∧ dog(y) ∧ arg2(x,z) ∧ man(z) | hf |
| ∃ x,y bite(x) ∧ arg1(x,y) ∧ man(y) | mlf |
| ∃ x chihuahua(x) | mlf |

With such frequencies, while there are many instances of dogs biting men in the corpus, there are few occurrences of men biting anything. A query event such as ∃ x,y,z bite(x) ∧arg1(x,y) ∧dog(y) ∧arg2(x,z) ∧man(z) which is below the mlf event ∃ x,y bite(x) ∧arg1(x,y) ∧man(y) ("man bites . . . ") will only inspect those segments related to the mlf event. A query such as "angry Chihuahua bites peaceful man" is subsumed by the simple mlf event ∃ x chihuahua(x), resulting also in a limited search. The expression "man(y)" in a formula means that the word "man" actually appears in the representation. Thus as words, "man" and "mailman" are different and incomparable. Assuming that the frequency of the event "∃ x,y bite(x) ∧arg1(x,y) ∧mailman(y)" is mlf, as set forth in the following illustrative extended table:

| Event | Frequency |
| --- | --- |
| ∃ x,y,z bite(x) ∧ arg1(x,y) ∧ dog(y) ∧ arg2(x,z) ∧ man(z) | hf |
| ∃ x,y bite(x) ∧ arg1(x,y) ∧ man(y) | mlf |
| ∃ x,y bite(x) ∧ arg1(x,y) ∧ mailman(y) | mlf |
| ∃ x chihuahua(x) | mlf | then the query "crazy mailman bites sleeping dog" will be subsumed by the third event in the table, similarly to what was the case with "man" previously. While this is advantageous from a retrieval-time viewpoint, this is not as advantageous from the storage space viewpoint, because as soon as there is at least one instance in the corpus of such cases as "policeman bites X", "politician bites X", "physicist bites X", or so forth, there will need to be a "mailman-like" mlf entry in the index to address these instances (assuming that mailmen, policemen, politicians and physicists are themselves high-frequency, otherwise a "chihuahua-type" singleton entry would preempt the more complex entry). Thus, the formulas are optionally extended to include as unary literals not only literals referring to single words, but also to broader concept types such as ANIMAL, HUMAN, and so forth.

We can explicitly introduce such concept-type order structures by: (i) stipulating the inclusion order between conceptual types: policeman>HUMAN>ANIMATE, and so forth, where we use uppercase to denote higher-level concepts and lowercase to denote words; and (ii) extending the order structure between formulas to account for the order between concepts in a suitable way, such as:

bite(x)∧arg1(x,y)∧chihuahua(y)∧arg2(x,z)
∧policeman(z)>bite(x)∧arg1(x,y)∧ANIMAL(y)
∧arg2(x,z)∧HUMAN(z)>bite(x)∧arg2(x,z)
∧HUMAN(z).

If the order structure is extended in this way, and if the event ∃ x,y bite(x) ∧arg1(x,y)∧HUMAN(y) is actually mlf in the corpus, then the previously mlf events such as "mailman bites X", "policeman bites X", and so forth are now subsumed under this single event, and disappear from the table, which becomes:

| Event | Frequency |
| --- | --- |
| ∃ x,y,z bite(x) ∧ arg1(x,y) ∧ dog(y) ∧ arg2(x,z) ∧ man(z) | hf |
| ∃ x,y bite(x) ∧ arg1(x,y) ∧ HUMAN(y) | mlf |
| ∃ x chihuahua(x) | mlf |

It is seen from this example that extending the event hierarchy in this way can be advantageous for limiting the proliferation of mlf events stored in the index. Intuitively speaking, if the event hierarchy is extended in this way, then low frequency events are preempted earlier by mlf elements of the database than they would otherwise be.

One suitable use of such an index in which the indexed event type is a finite set of first-order logical formulas relating words, in which the segments of the corpus are annotated with parts-of-speech, and the finite set of first-order logical formulas define grammatical expressions conforming with a grammar operative on the parts-of-speech.

Although the technique of higher-level types have been described with illustrative application to semantics, such techniques are readily applied to other events such as discontinuous or continuous ordered word sequences. For example, application to continuous word sequences can form a basis for n-gram language models, with n of variable length, and using such type inclusions as: word<synset, or other similar categories. For example, rather than considering such events as the 6-gram "I am pleased to introduce John" generalizations can be considered such as "I am pleased to introduce PERSON".

While the indexing examples set forth herein are applied to text-based corpora, it is to be appreciated that corpora other than text-based corpora can also be indexed using the hierarchical indexing techniques set forth herein. For example, in the case of image corpora, segments are suitably pre-processed images that are annotated with features. The indexing may employ events of a type indicative of the presence or absence of selected features, events of a type indicative of spatial relationships between features (such as two edges within certain proximity and satisfying certain orientation constraints) or so forth. For example, the annotated features may be in the form of feature vectors, principal component analysis (PCA) annotations, or so forth.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An indexing method comprising:
    deriving from a corpus of segments a hierarchical index that indexes events of a selected event type occurring in segments of the corpus at a frequency higher than or equal to a threshold frequency, the hierarchical index having a hierarchy relating events by an order structure in which coarser events subsume finer events, the hierarchical index further indexing low frequency events that (1) occur in segments of the corpus at a frequency lower than the threshold frequency and (2) are not subsumed by any coarser low frequency events occurring in segments of the corpus at a frequency lower than the threshold frequency; and processing a query respective to a queried event, the processing referencing information stored in the index relating to either (i) the queried event if the queried event is indexed or (ii) a coarser event that is indexed and that subsumes the queried event if the queried event is not indexed;

wherein the deriving and processing is performed by at least one processor.

2. The indexing method as set forth in claim 1, wherein the query requests retrieval of segments that satisfy a predicate associated with the queried event, and the processing comprises:

(i) retrieving segments indicated in the index as satisfying the predicate associated with the queried event if the queried event is indexed, or (ii) searching segments indicated in the index as satisfying a predicate associated with the coarser event that is indexed and that subsumes the queried event to determine whether the searched segments satisfy the predicate associated with the queried event if the queried event is not indexed.

3. The indexing method as set forth in claim 1, wherein the query requests statistical information pertaining to the queried event, and the processing comprises:

(i) retrieving statistical information stored in the index relating to the queried event if the queried event is indexed, or (ii) processing segments indicated in the index as satisfying a predicate associated with the coarser event to compute the requested statistical information if the queried event is not indexed.

4. The indexing method as set forth in claim 1, wherein the selected event type includes a bag-of-one-or-more-words and the order structure defines a finer event as a bag of words containing all words of a coarser event plus at least one more word.

5. The indexing method as set forth in claim 1, wherein the selected event type includes a discontinuous ordered word sequence including two or more words and the order structure is defined as follows: if an event a can be derived from an event b by omitting one or more words of the discontinuous ordered word sequence of event b, then event a is a coarser event respective to event b and event b is a finer event respective to event a.

6. The indexing method as set forth in claim 1, wherein the selected event type includes a discontinuous ordered word sequence including two or more words and the order structure is defined as follows: if the discontinuous ordered word sequence of an event a is a prefix of the discontinuous ordered word sequence of an event b, then event a is a coarser event respective to event b and event b is a finer event respective to event a.

7. The indexing method as set forth in claim 1, wherein the selected event type includes a finite set of first-order logical formulas relating words.

8. The indexing method as set forth in claim 1, wherein the selected event type includes at least two different event types.

9. The indexing method as set forth in claim 1, wherein the selected event type includes a first event type, a second event type, and a conjunctive event type defined as a conjunction of an event of the first event type and an event of the second event type.

10. The indexing method as set forth in claim 1, wherein the deriving comprises:

(0) initializing the corpus as an empty corpus;

(x) adding a selected segment to the corpus;

(t) discovering all events of the selected event type in the selected segment;

(a) determining whether each discovered event occurs in segments of the corpus including the selected segment at a frequency greater than or equal to the threshold frequency;

(n) based on the determining for each discovered event, updating an existing index entry or adding a new index entry; and (b) repeating the operations (x), (t), (a), and (n) until all segments of interest have been added to the corpus.

11. The indexing method as set forth in claim 10, wherein the determining comprises:

conditional upon existence of an index entry corresponding to the discovered event, performing the determining based in information stored in the index for the index entry; and conditional upon existence of a coarser index entry corresponding to an event that is coarser respective to the discovered event, performing the determining by analyzing segments associated in the index with the coarser index entry.

12. The indexing method as set forth in claim 10, further comprising:

(p) after termination of the operation (b), performing at least one information or segment retrieval operation using the index;

(q) after performing the retrieval operation (p), identifying one or more additional segments to be added to the corpus; and (j) repeating the operations (x), (t), (a), (n), and (b) to add the one or more additional segments to the corpus.

13. An information system comprising at least one processor implementing electronic information storage including:

a hierarchical index having a hierarchy relating events of a selected type by an order structure in which coarser events subsume finer events, the hierarchical index containing entries for:

all high frequency events of the selected type occurring in segments of a corpus at a frequency higher than or equal to a threshold frequency, the hierarchical index storing for each high frequency event at least one statistical datum, and all minimal low frequency events of the selected type that occur in segments of the corpus at a frequency lower than the threshold frequency and that are not subsumed by any coarser low frequency events that occur in segments of the corpus at a frequency lower than the threshold frequency, the hierarchical index storing for each minimal low frequency event at least an identification of the segments of the corpus that satisfy a predicate associated with the minimal low frequency event; and a query processor configured to receive a query requesting information satisfying or retrieval of segments satisfying a query criterion, the query processor determining the information satisfying or retrieving zero or more segments satisfying the query criterion with reference to the index database.

14. The information system as set forth in claim 13, wherein the hierarchical index further contains entries for a subset of all low frequency events of the selected type that occur n segments of the corpus at a frequency lower than the threshold frequency.

15. The information system as set forth in claim 13, wherein the threshold frequency is different for different paths along the order structure.

16. The information system as set forth in claim 13, wherein the hierarchical index stores for each high frequency event an identification of the segments of the corpus that satisfy a predicate associated with the high frequency event.

* * * * *